Jan. 15, 1963  J. W. JEFFS  3,073,633
SCREW COUPLINGS

Filed May 19, 1959  2 Sheets-Sheet 1

INVENTOR
JEFFREY WILLIAM JEFFS
BY
Irwin S. Thompson
ATTORNEY

Jan. 15, 1963   J. W. JEFFS   3,073,633
SCREW COUPLINGS
Filed May 19, 1959   2 Sheets-Sheet 2
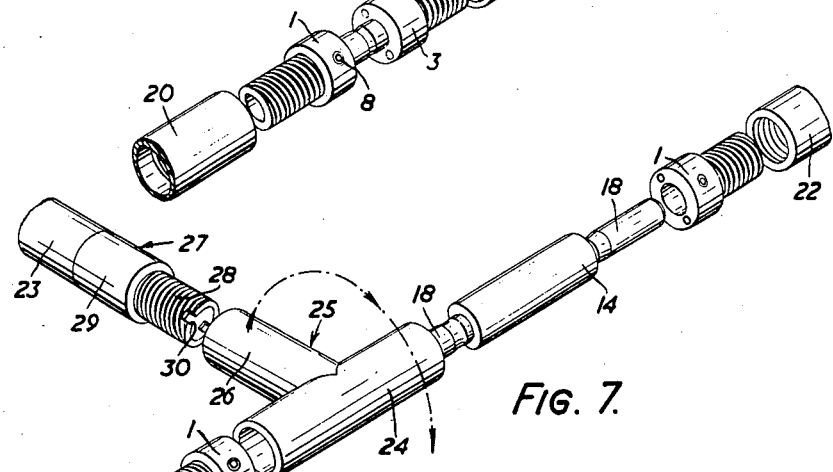
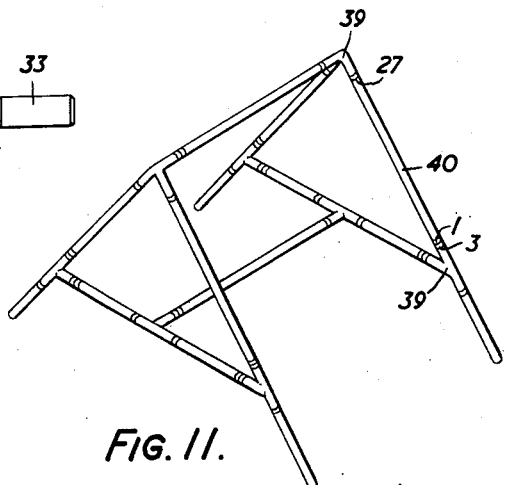
INVENTOR
JEFFREY WILLIAM JEFFS
BY
Irwin S. Thompson
ATTORNEY

United States Patent Office 3,073,633
Patented Jan. 15, 1963

3,073,633
SCREW COUPLINGS
Jeffrey William Jeffs, Woodland View, Cranham,
Gloucestershire, England
Filed May 19, 1959, Ser. No. 814,264
Claims priority, application Great Britain May 21, 1958
8 Claims. (Cl. 287—54)

This invention relates to screw couplings adapted to couple together lengths of rod or tube.

The use of screw couplings is a very convenient way of coupling together lengths of, for example, tube used in constructional work. Using tube cut to standard lengths with their ends pre-threaded, and a number of standard shapes of couplings, a wide variety of structures can be built rapidly and with little effort. With temporary structures in particular the use of screw couplings is of great merit, as the structure can readily be dismantled and the various components thereof reused over and over again. Whilst the types of coupling currently in common use can be shaped to provide the desired angular displacement between the axes of lengths of tube coupled thereby, these couplings suffer from the disadvantage that the relative angular position of each length of tube about its own axis cannot readily be adjusted; normally it cannot be adjusted if the length of tube concerned and the coupling are screwed home tight. Accordingly in order to obtain the required angular position of a length of tube about its own axis it is not screwed home on the coupling. This expedient, however, involves that the length of tube is not rigidly held by the coupling in this angular position with the attendant disadvantage that the overall rigidity of the structure suffers.

An object of the invention is the provision of a coupling member which will enable the angular position of a coupled length of rod or tube about its own axis to be adjusted, whilst screwed home tight on the coupling member, relatively to the remainder of a structure in which it is embodied.

A coupling member according to the invention is screw-threaded at one end and formed at its opposite end with a socket adapted to receive a spigot portion of a complementary coupling member so as to be radially located thereon, and is provided with means which enable it to be rigidly locked in a desired angular position on the spigot portion of the complementary coupling member. The central axis of the socket coincides with the screw-threaded axis.

The coupling member is preferably provided with a male thread and an abutment shoulder against which a length of internally threaded tube may be screwed up tight.

Preferably the socket is formed by an axial bore in the coupling member so as to cooperate with a cylindrical spigot of the complementary member. The axial bore may pass through the coupling member from end to end so that the latter is itself of tubular form; this allows the maximum length of engagement with the spigot for a given length of coupling member.

Grub-screws threaded through the wall of the coupling member may conveniently be used to lock the latter in its adjusted position on the corresponding spigot. These grub-screws, which may be socketed setscrews, preferably bite against the outer inclined face of an annular recess formed in the spigot to assist in urging the coupling member against an abutment shoulder formed on the complementary coupling member adjoining the inner end of its spigot.

The complementary coupling member may be provided with one or more threaded portions enabling it to be coupled to one or more lengths of tube. In its simplest form the complementary coupling member is formed at one end with a spigot adapted to be received and engaged by a recessed coupling member and at its other end with an aligned threaded portion adapted to be screwed to a length of rod or tube.

Alternatively the complementary coupling member may be formed with a plurality of spigot portions, so that it may be engaged by a plurality of coupling members to which lengths of tube are threaded.

The complementary coupling member may be formed with a cylindrical section adjoining the spigot, so that it can take a bearing in a tubular support to form a hinge coupling. In this case the complementary coupling member may conveniently comprise a pivot pin provided at its ends with aligned spigots which are separated by a central cylindrical section. Two coupling members, with coupled tube structures, can be attached one at either end of the pivot pin so that the whole assembly is supported by the tubular support which serves as a bearing.

In some cases the tubular support may be flanged for fixing to another structure, such as the wall of a building. Alternatively the tubular support may be built into a bracket having one or more screw-threaded and/or spigot portions for coupling to one or more lengths of tube.

At suitable points throughout a tubular structure in which couplings comprising the coupling members and complementary coupling members of the invention are embodied, screw couplings of more conventional form may be used to couple together lengths of tube which do not require any particular relative angular disposition. Where such a disposition is important use of a coupling comprising a coupling member and complementary coupling member according to the invention is a particularly simple and economic way of achieving it without in any way impairing the rigidity of the structure.

The invention will now be further described with reference to the accompanying drawings which illustrate, by way of example, several embodiments of the invention, and in which.

Figure 1:
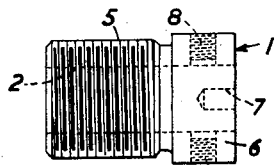
FIGURE 1 is a side view of a coupling member in accordance with the invention.
Figure 2:
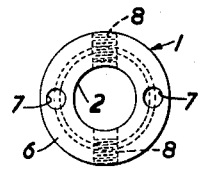
FIGURE 2 is an end view thereof.
Figure 3:
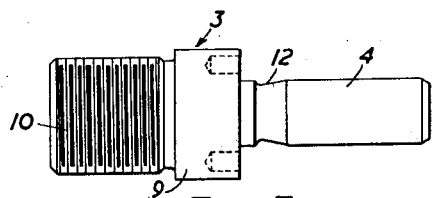
Figure 4:
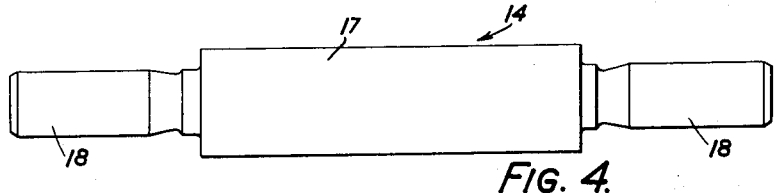
Figure 5:
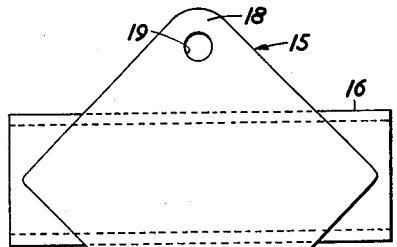
Figure 9:
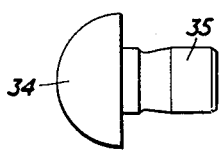

FIGURE 3 is a side view of a complementary coupling member which together with the member of FIGURE 1 forms a composite straight coupling, FIGURE 4 is a side view of a further complementary coupling member for use in a pivot coupling, FIGURE 5 is a side view of a pivot bracket for use with the coupling members of FIGURE 1 and FIGURE 4, FIGURE 6 is an exploded view of the composite coupling of FIGURES 1 to 3 as embodied in a tubular framework, FIGURE 7 is an exploded view of a T-hinge coupling using the coupling member of FIGURE 4 as embodied in a tubular framework, FIGURE 8 is a side view of an arcuate complementary coupling member, FIGURE 9 is a side view of an end plug for use with the coupling member of FIGURE 1.

Figure 10:
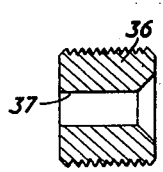

FIGURE 10 is a side view of a mounting adaptor, and

FIGURE 11 is an example of the type of framework which can readily be fabricated using couplings in accordance with the invention.

The composite straight coupling comprises the generally tubular coupling member 1 of FIGURES 1 and 2 having a central axial bore 2, and the complementary coupling member 3 of FIGURE 3 having at one end a cylindrical spigot 4 for reception in the axial bore 2. At its inner end the tubular coupling member 1 is provided with a male thread 5 by which it may be screwed into an internally threaded length of tube. At its other end the coupling member 1 has an annular flange 6 whose inner side face forms an abutment shoulder at the end of the male thread 5 against which the length of tube is screwed up.

The outer side face of the flange 6 is provided with two blind bores 7 whose axes lie in a diametrical plane of the member; these bores may be engaged by a pin wrench when screwing the coupling member 1 into the tube. A suitable form of pin wrench comprises an annular body which is an easy fit over the spigot 4 of the complementary coupling member 3 so as to be radially located thereby and has two pins projecting from one side face of the body while a lever handle extends radially from the latter.

Threaded through the flange 6 of the tubular coupling member 1 are two diametrically opposed radially directed socketed set-screws 8 which may be tightened with a socket wrench to rigidly fix the tubular coupling member 1 on the spigot 4 of the complementary coupling member 3, in the desired relative angular disposition.

The complementary coupling member 3 has a central flange section 9 on one side of which the spigot 4 is formed and on the opposite side a threaded male plug 10. The flanges 8 and 9 on the two coupling members are of the same overall diameter and are in abutment when the coupling is assembled to provide a smooth outer cylindrical surface to the exposed portion of the coupling. By means of the male plug 10 the complementary coupling member 3 can be threaded into another internally threaded length of tube. The coupling is used to couple together two lengths of tube having the same outer diameter as the flanges 6 and 9, so that a joint is formed with a smooth and pleasing outer appearance. The flange 9 forms an abutment shoulder against which the corresponding length of tube may be screwed; this flange is also provided, on its face adjacent the spigot 4, with two blind bores 11 to suit the aforesaid pin wrench.

Made as a good sliding fit in the bore 2 the spigot 4 has a cylindrical surface in which is formed an annular recess 12. The latter has a side wall, on its side remote from the central flange 9, inclined at an angle of about 10° to the spigot axis. The annular recess 12 is so positioned on the spigot 4 that when the two flanges 6 and 9 are in abutment, with the spigot 4 within the bore 2, tightening of the set-screws 8 will cause them to bite on said side wall of the annular recess 12. Not only does this lock the two coupling members 1 and 3 together but, due to the inclination of the wall, it tends to produce an axially directed thrust on the coupling members and so maintain interengagement of the flanges 6 and 9. Before tightening up the setscrews 8 the relative orientation or angular position of the two coupling members 1 and 3, and hence of the attached lengths of tube, about the spigot axis can be adjusted as required. Thus such an adjustment can be made without slackening, either temporarily or permanently, the screw connection with either of the lengths of tube.

The coupling members 3 are conveniently made in two sizes with flanges 9 of ½ inch and 1 inch axial length respectively, so that when used with coupling members 1 having a flange 6 of ½ inch axial length a choice of composite couplings with an effective length of 1 inch or 2 inches is available. Such couplings, when used with a range of tubes in lengths of 3, 4, 5, 6, 7, 8, 9, 12, 15, 18, 24, 30, 36 and 42 inches, enables any length from 3 inches to 5 feet, in inch increments, to be obtained using a maximum of two lengths of tube.

The pivot coupling comprises two tubular coupling members 1 as already described, the complementary coupling member 14 of FIGURE 4 which is in the form of a pivot pin, and the pivot bracket 15 of FIGURE 5 which incorporates a tubular support 16 for the pivot pin 14. The latter has a central cylindrical section 17 formed at either end with a cylindrical spigot 18 of lesser diameter. These spigots 18 are of similar form to the spigot 4 of the coupling member 3 already described.

The two annular end faces of the central section 17 serve as abutment shoulders for the flanges 6 of the two coupling members 1 when the latter are respectively mounted on the two spigots 18 and their set-screws 8 tightened up. The diameter of the central section 17 is, however, less than that of the flanges 6 so that the latter provide, when the members 1 are fixed on the spigots 18, annular locating shoulders at either end of the central section 17.

The tubular support 16 is welded to the surface of a flange plate 18 provided with holes 19 to enable it to be bolted or screwed to a supporting structure.

Referring to FIGURE 6, the composite straight coupling 1, 3 is shown as used to couple together a length of internally threaded tube 20 and one limb of an internally threaded T bracket 21. It will be seen that this enables the relative orientation of the tube 20 and the bracket 21 to be adjusted before the coupling members 1 and 3 are clamped together by tightening the set-screws 8.

The similar view of FIGURE 7 shows a T hinge coupling by means of which two aligned internally threaded tubes 22 can be rigidly coupled together and pivotally mounted at the end of a similar straight tube 23. The coupling has a pivot pin 14, as shown in FIGURE 4, used in combination with two coupling members 1, as shown in FIGURES 1 and 2, in the manner already described in connection with the pivot bracket 15 of FIGURE 5. The coupling members 1 are screwed into the adjacent ends of the tubes 22 and the pivot pin 14 is received in a cross-piece 24 of a T bracket 25. The cross-piece 24 thus forms a tubular support for the pin 14 and is bored through to provide a bearing surface for the central section of the latter whilst being of a length to fit freely between the locating shoulders formed when the coupling members 1 are mounted on the two spigots 18.

The limb 26 of the bracket 25 extends from the centre of the cross-piece 24 at right angles thereto and is provided with an internal thread at its outer end. A non-adjustable screw coupling 27 is screwed into the limb 26 with its other end screwed into the tube 23. Thus the tube 23, and the structure associated with it, can pivot freely on the pin 14 about the longitudinal axis of the cross-piece 24.

The non-adjustable coupling 27 is of unitary tubular form provided at either end with male threaded portions such as 28 separated by a central flange section 29. The section 29 provides abutment shoulders for the threaded portions 28 and is of the same outer diameter as the lengths of tube 22 and 23, the cross-piece 24 and the limb 25. Thus the whole coupling presents a smooth outer surface which is continuous with the outer surfaces of the three coupled lengths of tube.

At each end of the coupling 27 the walls thereof are provided with a diametrical slot such as 30, and a suitable tool may be placed across these slots and used as a lever to screw the coupling into the tube 23. This tool may be the shaft of the afore-mentioned pin wrench or a second form of pin wrench may be employed which is similar to the first except that the bore of the latter is replaced by a projecting plug which is an easy fit in the bore of the coupling 27 and has a cross-piece projecting diametrically adjacent to a larger diameter body portion of the wrench.

The arcuate complementary coupling member illustrated in FIGURE 8 has a central arcuate tubular section 31 into which are braised end plugs 32 formed with spigot sections 33 similar in form to the spigots 4 and 18 already described. This coupling member together with two coupling members such as 1 of FIGURES 1 and 2 provides a right angle coupling between two lengths of tube, but it will be appreciated that the arc of the section 31 can be chosen to provide the desired relative inclination of the two coupling lengths of tube.

FIGURE 9 illustrates an end closure plug having a radiused cap 34 and a spigot portion 35 formed for clamping in the coupling member of FIGURES 1 and 2 to provide a smooth end closure for a length of tube. The mounting adaptor illustrated in FIGURE 10 has an externally threaded body 36 to which a length of tube can be screwed and is bored through at 37 to enable the adaptor to be screwed or bolted to a supporting structure.

The fabricated trestle illustrated in FIGURE 11 is an example of a three-dimensional framework which can readily be constructed using couplings according to the invention. Suitably shaped corner brackets such as 39 are coupled together by straight lengths of tube 40 through non-adjustable screw couplings such as 27 of the type previously described and composite straight couplings such as 1, 3. The corner brackets 39 are internally threaded and preferably take the form of castings in a light material such as an aluminium alloy, and the relative inclination of the bracket limbs is preferably such that triangulated structures are obtained the component triangles of which have sides possessing a length ratio of 3:4:5. This enables the aforesaid range of tube lengths to be used in the fabrication of a large range of sizes and types of structures.

I claim:

1. A screw coupling comprising a coupling member screw-threaded at one end and formed at its opposite end with a socket, a complementary coupling member also screw-threaded at one end and formed at its opposite end with a spigot portion which can be freely inserted into said socket in the axial direction, said coupling members having abutment shoulders which interengage when said spigot portion is fully home in said recess, and a grub screw threaded through the wall of the first-mentioned member for engagement with a peripheral annular recess in said spigot portion whereby the latter can be rigidly locked in any desired angular position within said socket, said peripheral groove having an inclined wall with which said grub screw engages to produce an axially directed thrust urging said abutment shoulders together.

2. A coupling according to claim 1, wherein said abutment shoulders are provided by annular flanges of the members.

3. A screw coupling for coupling together two lengths of internally threaded tube in any desired angular relationship, comprising a coupling member formed at one end with an external screw thread which terminates adjacent an abutment shoulder against which one of said lengths of tube can be screwed, said member being formed at its other end with a smooth-walled socket and an end face forming an abutment face, a complementary coupling member formed at one end with an external screw thread which terminates adjacent an abutment shoulder against which the other of said lengths of tube can be screwed, said complementary member being formed at its other end with a projecting spigot portion arranged for mating engagement within said socket so as to be radially located therein, and formed with an abutment face at the inner end of said spigot portion, said abutment faces engaging one with the other when said spigot portion is fully home within said recess to provide axial location for said members, and a grub screw threaded through the wall of said socket for locking said spigot portion in the desired angular position within said socket.

4. A screw coupling for coupling together two lengths of internally threaded tube in any desired angular relationship, comprising a coupling member formed at one end with an external screw thread which terminates adjacent an abutment shoulder against which one of said lengths of tube can be threaded, said member being formed at its other end with a cylindrical socket coaxial with said screw thread and an end face forming an abutment face, a complementary coupling member formed at one end with an external screw thread which terminates adjacent an abutment shoulder against which the other of said lengths of tube can be screwed, said complementary member being formed at its other end with a projecting cylindrical spigot portion arranged for mating engagement within said socket so as to be radially located therein and formed with an abutment face at the inner end of said spigot portion, said abutment faces engaging one with the other when the spigot portion is fully home within the recess to provide axial location for said members, and a screw threaded through the wall of said socket for locking said spigot portion in the desired angular position within said socket.

5. A coupling according to claim 4, wherein said spigot portion has a peripheral annular groove with which said screw engages.

6. A screw coupling for coupling together two lengths of tube in any desired angular relationship, comprising a coupling member formed at one end with an external screw thread which terminates adjacent an abutment shoulder against which one of said lengths of tube can be screwed on said screw thread, said member being formed at its other end with a smooth-walled socket and an end face forming an abutment face, a complementary coupling member formed for attachment at one end to the other of said lengths of tube, said complementary member being formed at its other end with a projecting spigot portion, arranged for mating engagement within said socket, so as to be radially located therein and formed with an abutment face at the inner end of said spigot portion, said abutment faces engaging one with the other when said spigot portion is fully home within said recess to provide axial location for said members, and a grub screw threaded through the wall of said socket for locking said spigot portion in the desired angular position within said socket.

7. A screw coupling for coupling together two lengths of internally threaded tube in any desired angular relationship, comprising a coupling member formed at one end with an external screw thread which terminates adjacent an abutment shoulder against which one of said lengths of tube can be threaded, said member being formed at its other end with a socket having a cylindrical wall and an end face forming an abutment face, a complementary coupling member formed for attachment to one end of the other of said lengths of tube and formed at its other end with a projecting cylindrical spigot portion, arranged for mating engagement within said socket so as to be radially located therein, and formed with an abutment face at the inner end of said spigot portion, said abutment faces engaging one with the other when said spigot portion is fully home within said recess to provide axial location for said members, and a screw threaded through the wall of said socket for locking said spigot portion in the desired angular position within said socket.

8. A screw coupling comprising a coupling member externally screw-threaded at one end and formed at its opposite end with a socket, a complementary coupling member also externally screw-threaded at one end and formed at its opposite end with a spigot portion which can be freely inserted in the axial direction into said socket so as to be radially located therein, each of said members being formed with an abutment shoulder against which a length of internally screw-threaded tube can be screwed on the corresponding external screw-thread, and locking means enabling said spigot portion to be rigidly locked in any desired angular position within said socket.

References Cited in the file of this patent

UNITED STATES PATENTS

| | | |
|---|---|---|
| 716,333 | Davis | Dec. 16, 1902 |
| 1,384,045 | Burns | July 12, 1921 |
| 1,547,072 | Silicott | July 21, 1925 |
| 2,449,284 | Dorman | Sept. 14, 1948 |
| 2,609,638 | Lindenmeyer | Sept. 9, 1952 |
| 2,619,368 | Anderson | Nov. 25, 1952 |
| 2,656,191 | Fladung | Oct. 20, 1953 |
| 2,714,026 | Schultz | July 26, 1955 |

FOREIGN PATENTS

| | | |
|---|---|---|
| 477,946 | Canada | Oct. 23, 1951 |